United States Patent
Cheng et al.

(10) Patent No.: US 10,706,049 B2
(45) Date of Patent: Jul. 7, 2020

(54) METHOD AND APPARATUS FOR QUERYING NONDETERMINISTIC GRAPH

(71) Applicant: Huawei Technologies Co., Ltd., Shenzhen, Guangdong (CN)

(72) Inventors: Jiefeng Cheng, Hong Kong (HK); Cheng He, Shenzhen (CN); Wei Fan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 855 days.

(21) Appl. No.: 15/339,530

(22) Filed: Oct. 31, 2016

(65) Prior Publication Data
US 2017/0046387 A1 Feb. 16, 2017

Related U.S. Application Data

(63) Continuation of application No. PCT/CN2015/072649, filed on Feb. 10, 2015.

(30) Foreign Application Priority Data

Apr. 30, 2014 (CN) .......................... 2014 1 0182375

(51) Int. Cl.
*G06F 16/24* (2019.01)
*G06F 16/2453* (2019.01)
(Continued)

(52) U.S. Cl.
CPC .... *G06F 16/24542* (2019.01); *G06F 16/2455* (2019.01); *G06F 16/9024* (2019.01)

(58) Field of Classification Search
CPC ............. G06F 16/2454; G06F 16/2455; G06F 16/9024
See application file for complete search history.

(56) References Cited

U.S. PATENT DOCUMENTS 5,752,241 A * 5/1998 Cohen ............... G06F 16/24545
707/713
9,063,979 B2 * 6/2015 Chiu ................... G06F 16/2448
(Continued)

FOREIGN PATENT DOCUMENTS

CN 102799674 A 11/2012

OTHER PUBLICATIONS

Zou et al. "Finding Top-k Maximal Cliques in an Uncertain graph", Apr. 2010, pp. 649-652, 4 pages. (Year: 2010).*
(Continued)

*Primary Examiner* — Kris E Mackes
*Assistant Examiner* — Tiffany Thuy Bui
(74) *Attorney, Agent, or Firm* — Fish & Richardson P.C.

(57) ABSTRACT

The present invention discloses a method and apparatus for querying a nondeterministic graph, which are used to implement quick query of a nondeterministic graph, reduce query complexity, and improve query efficiency. The method comprises receiving a query instruction, where the query instruction is used to query a nondeterministic graph for data that satisfies a query condition; determining two vertices in the nondeterministic graph according to the query instruction; determining all possible paths that use one vertex in the two vertices as a start point and the other vertex as an end point; calculate a probability of a first event or a second event corresponding to each of the paths; and obtaining, according to the probability of the first event or the probability of the second event, a query result corresponding to the query instruction.

12 Claims, 4 Drawing Sheets

(51) Int. Cl.
G06F 16/2455 (2019.01)
G06F 16/901 (2019.01)

(56) References Cited

U.S. PATENT DOCUMENTS

| | | | | |
|---|---|---|---|---|
| 9,292,695 | B1* | 3/2016 | Bassett | G06F 21/577 |
| 2007/0136788 | A1* | 6/2007 | Monahan | H04L 63/20 |
| | | | | 726/3 |
| 2007/0156330 | A1* | 7/2007 | Goldberg | G01C 21/3446 |
| | | | | 701/533 |
| 2007/0239694 | A1* | 10/2007 | Singh | G06F 16/9024 |
| 2008/0056291 | A1* | 3/2008 | Liu | G06F 9/5066 |
| | | | | 370/431 |
| 2012/0269200 | A1* | 10/2012 | Aggarwal | H04L 47/00 |
| | | | | 370/410 |
| 2012/0271833 | A1* | 10/2012 | Wang | G06F 16/90335 |
| | | | | 707/743 |
| 2013/0132369 | A1* | 5/2013 | Delling | G01C 21/3446 |
| | | | | 707/716 |
| 2013/0138662 | A1* | 5/2013 | He | G06Q 30/0269 |
| | | | | 707/748 |
| 2013/0311517 | A1* | 11/2013 | Kementsietsidis | |
| | | | | G06F 16/2458 |
| | | | | 707/798 |
| 2013/0311582 | A1* | 11/2013 | Thai | H04L 51/32 |
| | | | | 709/206 |
| 2014/0006871 | A1* | 1/2014 | Lakshmanan | H04L 41/065 |
| | | | | 714/37 |
| 2015/0019592 | A1* | 1/2015 | Jin | G06F 16/9024 |
| | | | | 707/798 |
| 2015/0248462 | A1* | 9/2015 | Theeten | G06F 16/24568 |
| | | | | 707/688 |
| 2016/0205122 | A1* | 7/2016 | Bassett | G06F 21/577 |
| | | | | 726/23 |

OTHER PUBLICATIONS

Jiefeng Cheng et al., "On-line Exact Shortest Distance Query Processing", Mar. 24, 2009, 12 pages.
Ao-Ying Zhou et al., "A Survey on the Management of Uncertain Data", Chinese Journal of Computers, vol. 32, No. 1, Jan. 2009, 16 pages.
Xiang Lian et al., "Monochromatic and bichromatic reverse skyline search over uncertain databases", SIGMOD '08 Proceedings of the 2008 ACM SIGMOD International Conference on Management of Data, Jun. 9-12, 2008, 2 pages. (Abstarct).
Ralf Schenkel et al., "HOPI: An Efficient Connection Index for Complex XML Document Collections", 2004, 19 pages.
Sungwon Jung et al., "An Efficient Path Computation Model for Hierarchically Structured Topographical Road Maps" IEEE Transactions on Knowledge and Data Engineering, vol. 14, No. 5, Sep./Oct. 2002, 18 pages.
Vebjorn Ljosa et al., "APLA: Indexing Arbitrary Probability Distributions", 2007, 10 pages.
Ruoming Jin et al., "Computing Label-Constraint Reachability in Graph Databases", 2010, 12 pages.
Jagan Sankaranarayanan et al., "Distance Oracles for Spatial Networks", IEEE International Conference on Data Engineering, 2009, 12 pages.
Ruoming Jin et al., "Distance-Constraint Reachability Computation in Uncertain Graphs", The 37th International Conference on Very Large Data Bases, Aug. 29-Sep. 3, 2011, 12 pages.
Haixun Wang et al., "Dual Labeling: Answering Graph Reachability Queries in Constant Time", ICDE '06. Proceedings of the 22nd International Conference on Data Engineering, Apr. 3-7, 2006, 12 pages.
Ralf Schenkel et al., "Efficient Creation and Incremental Maintenance of the HOPI Index for Complex XML Document Collections", ICDE '05 Proceedings of the 21st International Conference on Data Engineering, Apr. 5-8, 2005, 12 pages.

Odysseas Papapetrou et al., "Efficient Discovery of Frequent Subgraph Patterns in Uncertain Graph Databases", 2011, 12 pages.
Reynold Cheng et al., "Efficient Indexing Methods for Probabilistic Threshold Queries over Uncertain Data", VLDB '04 Proceedings of the Thirtieth international conference on Very large data bases—vol. 30, Aug. 31-Sep. 3, 2004, 12 pages.
Rakesh Agrawal et al., "Efficient Management of Transitive Relationships in Large Data and Knowledge Bases", 1989, 10 pages.
Ke Yi et al., "Efficient Processing of Top-k Queries in Uncertain Databases with x-Relations", IEEE Transactions on Knowledge and Data Engineering, vol. 20, No. 12, Dec. 2008, 14 pages.
Nilesh Dalvi et al., "Efficient query evaluation on probabilistic databases", The VLDB Journal (2007), published online Jun. 10, 2006, 22 pages.
Ye Yuan et al., "Efficiently Answering Probability Threshold-Based SP Queries over Uncertain Graphs", DASFAA, 2010, 2 pages.
Ruoming Jin et al., "Efficiently Answering Reachability Queries on Very Large Directed Graphs", SIGMOD'08, Jun. 8-12, 2008, 13 pages.
Reynold Cheng et al., "Evaluating Probabilistic Queries over Imprecise Data", Proceedings of ACM SIGMOD Conference, Jun. 9-12, 2003, 13 pages.
Silke Tribi et al., "Fast and Practical Indexing and Querying of Very Large Graphs", SIGMOD'07, Jun. 12-14, 2007, 12 pages.
Jiefeng Cheng et al., "Fast Computing Reachability Labelings for Large Graphs with High Compression Rate", EDBT'08, Mar. 25-30, 2008, 12 pages.
Petteri Hintsanen et al., "Finding reliable subgraphs from large probabilistic", Data Min. Knowl. Disc (2008), Published online Jul. 9, 2008, 21 pages.
Zhaonian Zou et al., "Frequent Subgraph Pattern Mining on Uncertain Graph Data", CIKM'09, Nov. 2-6, 2009, 10 pages.
Xifeng Yan et al., "Graph Indexing: A Frequent Structure-based Approach", SIGMOD 2004, Jun. 13-18, 2004, 12 pages.
Ning Jing et al., "Hierarchical Encoded Path Views for Path Query Processing: An Optimal Model and Its Performance Evaluation", IEEE Transactions on Knowledge and Data Engineering, vol. 10, No. 3, May/Jun. 1998, 24 pages.
Michalis Potamias et al., "k-Nearest Neighbors in Uncertain Graphs", VLDB'10, Sep. 13-17, 2010, 12 pages.
Amit Goyal et al., "Learning Influence Probabilities in Social Networks", WSDM'10, Feb. 4-6, 2010, 10 pages.
Bhargav Kanagal et al., "Lineage Processing over Correlated Probabilistic Databases", SIGMOD'10, Jun. 6-11, 2010, 12 pages.
"Managing and Mining Graph Data", Edited by Charu C. Aggarwal et al., Kluwer Academic Publishers, 2010, 91 pages.
"Managing and Mining Uncertain Data", Edited by Charu C. Aggarwal, Kluwer Academic Publishers, 2009, 513 pages.
David Kempe et al., "Maximizing the Spread of Influence through a Social Network", SIGKDD'03, 2003, 10 pages.
Jiewen Huang et al., "MayBMS: A Probabilistic Database Management System", SIGMOD'09, Jun. 29-Jul. 2, 2009, 3 pages.
Joy Ghosh et al., "On a Routing Problem within Probabilistic Graphs and its application to Intermittently Connected Networks", IEEE INFOCOM 2007 Proceedings, 2007, 9 pages.
Jiefeng Cheng et al., "On-line Exact Shortest Distance Query Processing", EDBT 2009, Mar. 24-26, 2009, 12 pages.
Jiefeng Cheng et al., "On-Line Preferential Nearest Neighbor Browsing in Large Attributed Graphs", DASFAA, 2010, 2 pages.
Saurabh Asthana et al., "Predicting Protein Complex Membership Using Probabilistic Network Reliability", Cold Spring Harbor Laboratory Press, May 2004, 7 pages.
Hans-Peter Kriegel et al., "Probabilistic Nearest-Neighbor Query on Uncertain Objects", In Proc. 12th International Conference on Database Systems for Advanced Applications, 2007, 12 pages.
Ming Hua et al., "Probabilistic Path Queries in Road Networks: Traffic Uncertainty Aware Path Selection", EDBT 2010, Mar. 22-26, 2010, 12 pages.
Jian Pei et al., "Probabilistic Skylines on Uncertain Data", VLDB'07, Sep. 23-28, 2007, 12 pages.
Dimitris Papadias et al., "Query Processing in Spatial Network Databases", Proceedings of the 29th VLDB Conference, 2003, 12 pages.

(56) References Cited

OTHER PUBLICATIONS

A. Prasad Sistla et al., "Querying the Uncertain Position of Moving Objects", 1998, 18 pages.
Edith Cohen et al., "Reachability and Distance Queries via 2-Hop Labels", SIAM J. Comput, vol. 32, No. 5, 18 pages.
Hanan Samet et al., "Scalable Network Distance Browsing in Spatial Databases", SIGMOD'08, Jun. 9-12, 2008, 12 pages.
Fang Wei, "TEDI: Efficient Shortest Path Query Answering on Graphs", SIGMOD 2010, 13 pages.
Lei Zou et al., "Top-K Possible Shortest Path Query over a Large Uncertain Graph", 2011, 2 pages.
Mohamed A. Soliman et al., "Top-k Query Processing in Uncertain Databases", May 15, 2007, 10 pages.
Parag Agrawal et al., "Trio: A System for Data, Uncertainty, and Lineage", VLDB'06, Sep. 12-15, 2006, 4 pages.
Ye Yuan et al., "Answering Probabilistic Reachability Queries over Uncertain Graphs", Chinese Journal of Computers, vol. 33, No. 8, Aug. 2010, 9 pages.
Guo-ren Wang et al., "Pattern match queries oriented to uncertain planar graphs", Journal of Computer Applications, vol. 31, No. 4, Apr. 2011, 8 pages.

\* cited by examiner

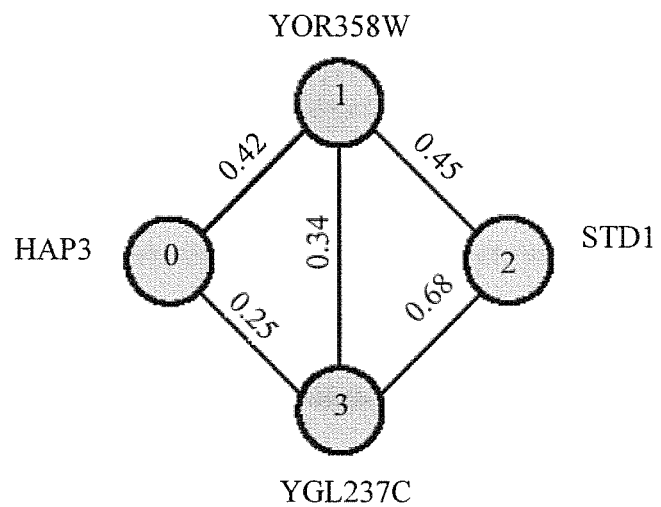
FIG. 1
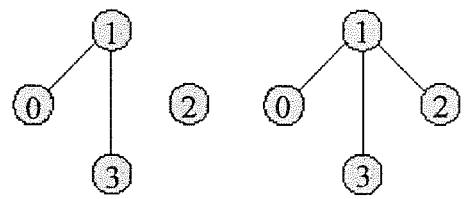
FIG. 2a
Pr = 0.0188
FIG. 2b
Pr = 0.0154
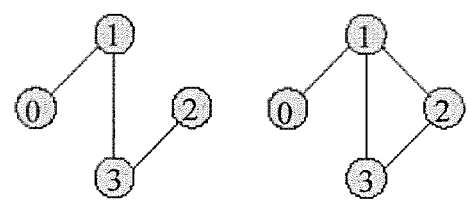
FIG. 2c
Pr = 0.0401
FIG. 2d
Pr = 0.0328

METHOD AND APPARATUS FOR QUERYING NONDETERMINISTIC GRAPH

CROSS-REFERENCE TO RELATED APPLICATIONS

This application is a continuation of International Application No. PCT/CN2015/072649, filed on Feb. 10, 2015, which claims priority to Chinese Patent Application No. 201410182375.4, filed on Apr. 30, 2014. The disclosures of the aforementioned applications are hereby incorporated by reference in their entireties.

TECHNICAL FIELD

The present invention relates to the field of computer technologies, and in particular, to a method and apparatus for querying a nondeterministic graph.

BACKGROUND

In recent years, with the development of new technologies such as triple play and new media such as a network, a large amount of graph data is generated. Graph data has two distinct characteristics. One is that a scale of a graph is large, and a scale of vertices is above a million, for example, Web information, extensive makeup language (XML, Extensive Makeup Language) data of a graph structure, and a social network; the other one is nondeterminacy of a graph structure, for example, a connection between vertices is nondeterministic. Nondeterminacy of graph data is common. For example, for personal mobile devices in a wireless ad-hoc network, there is no fixed network structure for a connection between the devices. In addition, due to impact of factors such as power of mobile devices, a connection between two devices is not always reliable but exists at a probability. For another example, proteins of any different types may interact with each other to form complex graph data. Because of a measurement error, interaction between two types of proteins that is observed in an experiment actually exists only at a probability. A nondeterministic graph model is fundamentally different from a previous graph data model. A nondeterministic graph is a probability event combination in which a vertex and an edge are used as a basic probability event, as shown in FIG. 1.

Currently, many query algorithms and index mechanisms that have high extensibility are proposed for large-scale graph data. However, these query algorithms and index mechanisms are basically based on deterministic graph structures but cannot be directly applied to a nondeterministic graph.

On the one hand, graph query is usually based on a graph structure, and basic graph query may be roughly classified into three types: (a) query based on a path in a graph, for example, reachability query and shortest path/distance query; (b) query based on a vertex in a graph, for example, nearest neighbor query; (c) query based on a sub-graph, for example, sub-graph matching and frequent sub-graph mining. On the other hand, in a nondeterministic database, each tuple is marked with a probability indicating a probability that the tuple is real, or an attribute of a tuple is expressed as a probability distribution function. A possible world model of nondeterministic data is proposed for the nondeterministic database, and by using a core "possible world model" of query processing of the nondeterministic data, a large quantity of graph instances with a deterministic structure can be derived from a nondeterministic graph. These graph instances with a deterministic structure are distributed according to corresponding probabilities and a sum of the probabilities is 1, as shown in FIG. 2.

A nondeterministic graph is constituted by a large quantity of small graphs, and in scale, each small graph has hundreds of vertices or thousands of edges at most. To make nondeterministic graph query have a probability guarantee that passes a possible world demonstration, graph searching needs to be performed on exponential graph instances derived from a nondeterministic graph, which has an unacceptable overhead, and a cost of query processing is very high.

Therefore, how to implement quick query of a nondeterministic graph becomes a to-be-solved technical problem.

SUMMARY

The present invention provides a method and apparatus for querying a nondeterministic graph, which are used to implement quick query of a nondeterministic graph, reduce query complexity, and improve query efficiency.

Specific technical solutions provided in embodiments of the present invention are as follows:

According to a first aspect, the present invention provides a method for querying a nondeterministic graph, including:

receiving a query instruction, where the query instruction is used to query the nondeterministic graph for data that satisfies a query condition;

determining two vertices in the nondeterministic graph according to the query instruction, and determining all possible paths that use one vertex in the two vertices as a start point and the other vertex as an end point;

calculating a probability of a first event or a second event corresponding to each of the paths, where: a first event corresponding to a path is defined as an event that the path exists, but a first path corresponding to the path does not exist and one or more second paths corresponding to the path do not exist; a second event corresponding to the path is defined as an event that the path exists but a first path corresponding to the path does not exist; a first path corresponding to a path is another path that includes a quantity of edges that is less than a quantity of edges included in the path; and a second path corresponding to a path is another path that includes a quantity of edges that is equal to a quantity of edges included in the path; and obtaining, according to the probability of the first event or the probability of the second event, a query result corresponding to the query instruction.

With reference to the first aspect, in a first possible implementation manner, the calculating a probability of a first event corresponding to each of the paths includes:

sorting all the determined possible paths in ascending order of a quantity of edges included in each of the determined possible paths, and calculating, according to a sorting result, the probability of the first event corresponding to each of the paths, where the first event of each of the paths is an event that the path exists but a third path corresponding to the path does not exist, and the third path corresponding to the path is another path that is sorted before the path in the sorting result; or the calculating a probability of a second event corresponding to each of the paths includes:

sorting all the determined possible paths in ascending order of a quantity of edges included in each of the determined possible paths; and calculating, according to a sorting result, the probability of the second event corresponding to each of the paths, where the second event of each of the paths is an event that the path exists but a first path corresponding to the path does not exist, and the first path corresponding to the path is another path that is sorted before the path in the sorting result and includes a quantity of edges that is less than a quantity of edges included in the path.

With reference to the first possible implementation manner of the first aspect, in a second possible implementation manner, the query instruction is a shortest distance query instruction, which is used to query probability distribution of a path that is in the nondeterministic graph, uses one vertex in the two vertices as a start point and the other vertex as an end point, and includes a set quantity of edges; and the obtaining, according to the probability of the first event or the probability of the second event, a query result corresponding to the query instruction includes:

determining the path that includes the set quantity of edges from all the possible paths, calculating a sum of a probability of a first event corresponding to each path in the determined path, and using the sum of the probability as the query result.

With reference to the first possible implementation manner of the first aspect, in a third possible implementation manner, the query instruction is a reachability query instruction, which is used to query a probability of existence of a path that is in the nondeterministic graph and uses one vertex in the two vertices as a start point and the other vertex as an end point; and the obtaining, according to the probability of the first event or the probability of the second event, a query result corresponding to the query instruction includes:

for each path in all the possible paths, calculating a sum of probabilities of first events corresponding to the path and another path that is sorted before the path, and using the sum of the probabilities as the query result.

With reference to the first possible implementation manner of the first aspect, in a fourth possible implementation manner, the query instruction is shortest path query, which is used to query probability distribution of a path that is in the nondeterministic graph, uses one vertex in the two vertices as a start point and the other vertex as an end point, and includes a least quantity of edges; and the obtaining, according to the probability of the first event or the probability of the second event, a query result corresponding to the query instruction includes:

using each path in all the possible paths and a probability of a second event corresponding to the path as the query result.

With reference to any one of the first aspect to the fourth possible implementation manner of the first aspect, in a fifth possible implementation manner, the calculating a probability of a first event or a second event corresponding to each of the paths includes:

selecting a set quantity of edges from the nondeterministic graph; determining a combination event corresponding to the selected edges, where the combination event indicates a combination of events that one or more edges in the selected edges exist or do not exist; and calculating a sum of probabilities of occurrence of all combination events corresponding to the selected edges and using the sum as a first cumulative sum;

when it is determined that the selected set quantity of edges constitute a path, and corresponding combination events satisfy a definition of the first event, calculating a sum of probabilities of occurrence of the combination events that satisfy the definition of the first event and using the sum as a second cumulative sum; or when it is determined that the selected set quantity of edges constitute a path, and corresponding combination events satisfy a definition of the second event, calculating a slam of probabilities of occurrence of the combination events that satisfy the definition of the second event and using the sum as a third cumulative sum; and calculating a sum of probabilities of existence of all paths in all the possible paths and using the sum as a fourth cumulative sum, and determining the probability of the first event according to the first cumulative sum, the second cumulative sum, and the fourth cumulative sum, or determining the probability of the second event according to the first cumulative sum, the third cumulative sum, and the fourth cumulative sum.

With reference to the fifth possible implementation manner of the first aspect, in a sixth possible implementation manner, the determining the probability of the first event according to the first cumulative sum, the second cumulative sum, and the fourth cumulative sum, or determining the probability of the second event according to the first cumulative sum, the third cumulative sum, and the fourth cumulative sum includes:

calculating a ratio of the second cumulative sum to the first cumulative sum, and using a value that is obtained by multiplying the ratio by the fourth cumulative sum as the probability of the first event; or calculating a ratio of the third cumulative sum to the first cumulative sum, and using a value that is obtained by multiplying the ratio by the fourth cumulative sum as the probability of the second event.

According to a second aspect, the present invention provides an apparatus for querying a nondeterministic graph, including:

a receiving module, configured to receive a query instruction, where the query instruction is used to query the nondeterministic graph for data that satisfies a query condition;

an acquiring module, configured to determine two vertices in the nondeterministic graph according to the query instruction, and determine all possible paths that use one vertex in the two vertices as a start point and the other vertex as an end point;

a calculating module, configured to calculate a probability of a first event or a second event corresponding to each of the paths, where: a first event corresponding to a path is defined as an event that the path exists, but a first path corresponding to the path does not exist and one or more second paths corresponding to the path do not exist; a second event corresponding to the path is defined as an event that the path exists but a first path corresponding to the path does not exist; a first path corresponding to a path is another path that includes a quantity of edges that is less than a quantity of edges included in the path; and a second path corresponding to a path is another path that includes a quantity of edges that is equal to a quantity of edges included in the path; and a determining module, configured to obtain, according to the probability of the first event or the probability of the second event, a query result corresponding to the query instruction.

With reference to the second aspect, in a first possible implementation manner, the calculating module is specifically configured to:

sort all the determined possible paths in ascending order of a quantity of edges included in each of the determined possible paths, and calculate, according to a sorting result, the probability of the first event corresponding to each of the paths, where the first event of each of the paths is an event that the path exists but a third path corresponding to the path does not exist, and the third path corresponding to the path is another path that is sorted before the path in the sorting result; or sort all the determined possible paths in ascending order of a quantity of edges included in each of the determined possible paths, and calculate, according to a sorting result, the probability of the second event corresponding to each of the paths, where the second event of each of the paths is an event that the path exists but a first path corresponding to the path does not exist, and the first path corresponding to the path is another path that is sorted before the path in the sorting result and includes a quantity of edges that is less than a quantity of edges included in the path.

With reference to the first possible implementation manner of the second aspect, in a second possible implementation manner, the query instruction is a shortest distance query instruction, which is used to query probability distribution of a path that is in the nondeterministic graph, uses one vertex in the two vertices as a start point and the other vertex as an end point, and includes a set quantity of edges; and the determining module is specifically configured to:

determine the path that includes the set quantity of edges from all the possible path, calculate a sum of a probability of a first event corresponding to each path in the determined path, and use the sum of the probability as the query result.

With reference to the first possible implementation manner of the second aspect, in a third possible implementation manner, the query instruction is a reachability query instruction, which is used to query a probability of existence of a path that is in the nondeterministic graph and uses one vertex in the two vertices as a start point and the other vertex as an end point; and the determining module is specifically configured to:

for each path in all the possible paths, calculate a sum of probabilities of first events corresponding to the path and another path that is sorted before the path, and use the sum of the probabilities as the query result.

With reference to the first possible implementation manner of the second aspect, in a fourth possible implementation manner, the query instruction is shortest path query, which is used to query probability distribution of a path that is in the nondeterministic graph, uses one vertex in the two vertices as a start point and the other vertex as an endpoint, and includes a least quantity of edges; and the determining module is specifically configured to:

use each path in all the possible paths and a probability of a second event corresponding to the path as the query result.

With reference to the second aspect to the fourth possible implementation manner of the second aspect, in a fifth possible implementation manner, the calculating module is specifically configured to:

select a set quantity of edges from the nondeterministic graph; determine a combination event corresponding to the selected edges, where the combination event indicates a combination of events that one or more edges in the selected edges exist or do not exist; and calculate a sum of probabilities of occurrence of all combination events corresponding to the selected edges and use the sum as a first cumulative sum;

when it is determined that the selected set quantity of edges constitute a path, and corresponding combination events satisfy a definition of the first event, calculate a sum of probabilities of occurrence of the combination events that satisfy the definition of the first event and use the sum as a second cumulative sum; or when it is determined that the selected set quantity of edges constitute a path, and corresponding combination events satisfy a definition of the second event, calculate a sum of probabilities of occurrence of the combination events that satisfy the definition of the second event and use the sum as a third cumulative sum; and calculate a sum of probabilities of existence of all paths in all the possible paths and use the sum as a fourth cumulative sum, and determine the probability of the first event according to the first cumulative sum, the second cumulative sum, and the fourth cumulative sum, or determine the probability of the second event according to the first cumulative sum, the third cumulative sum, and the fourth cumulative sum.

With reference to the fifth possible implementation manner of the second aspect, in a sixth possible implementation manner, the calculating module is specifically configured to:

calculate a ratio of the second cumulative sum to the first cumulative sum, and use a value that is obtained by multiplying the ratio by the fourth cumulative sum as the probability of the first event; or calculate a ratio of the third cumulative sum to the first cumulative sum, and use a value that is obtained by multiplying the ratio by the fourth cumulative sum as the probability of the second event.

Based on the foregoing technical solutions, in the embodiments of the present invention, a query result that satisfies a query condition is obtained by calculating a probability of a first event or a second event corresponding to each possible path, which can simplify different query conditions to an expression of the first event or the second event, thereby avoiding graph searching performed on exponential graph instances derived from a nondeterministic graph, implementing quick query of the nondeterministic graph, reducing query complexity, and improving query efficiency.

BRIEF DESCRIPTION OF THE DRAWINGS

FIG. 1 is a schematic structural diagram of a nondeterministic graph;

FIG. 2a and FIG. 2b and FIG. 2c and FIG. 2d are a schematic structural diagram of a possible world model of a nondeterministic graph;

DETAILED DESCRIPTION

Figure 3:
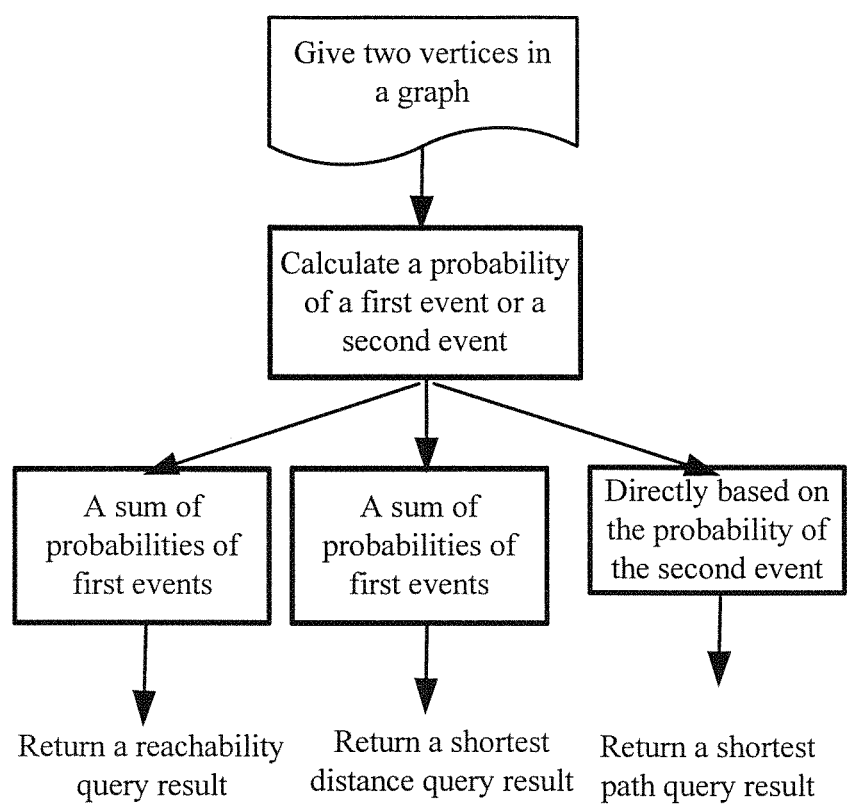
FIG. 3 is a schematic diagram of a process of querying a nondeterministic graph according to an embodiment of the present invention.

To make the objectives, technical solutions, and advantages of the present invention clearer, the following describes the present invention in further detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the following embodiments, the following definitions are used:

A nondeterministic graph G=(V,E) is defined as a connected graph constituted by a vertex set V and an edge set E, and each edge (u, v)∈E or e∈E exists at a probability $p$(u,v) or $p_e$, where $p$(u,v) or $p_e$ is also referred to as an existence probability of (u,v)∈E or e∈E.

A path P is defined as a series of connected edges in the nondeterministic graph G, and the series of connected edges do not constitute a ring. Because each edge (u,v)∈E or e∈E exists at a probability, the path P is also a probability event and exists at a probability.

A length len(P) of the path P is defined as a total quantity of all edges that constitute the path P, which is also marked as |P|.

An event that the path P exists is an event that all the edges that constitute the path P exist, where the event is marked as P and P=$e_1 \wedge e_2 \wedge \ldots \wedge e_{|P|}$.

A probability of the event that the path P exists is defined as Pr(P)=$\Pi_{e \in P} p_e$.

An s,t path P is defined as a path P that is in the graph G and whose head vertex and tail vertex are respectively s and t.

A reachability event $\mathcal{R}_d$ of two vertices within a distance d in the nondeterministic graph is defined as that a path P exists between s and t and satisfies len(P)≤d. In the embodiments of the present invention, a distance between two vertices is a quantity of edges included in a path that uses the two vertices as head and tail vertices.

A shortest path event $\mathcal{P}_P$ of two vertices s and t in the nondeterministic graph is defined as that a path P between s and t exists and a path whose length is shorter than that of the path does not exist, that is, P is the shortest path between s and t. In the embodiments of the present invention, a length of a path refers to a quantity of edges included in the path.

A shortest distance event $\mathcal{D}_d$ of two vertices s and t in the nondeterministic graph is defined as that a path P between s and t exists, and P is the shortest path between s and t and satisfies len(P)=d.

In the following embodiments, a first event corresponding to a path is defined as an event that the path exists, but a first path corresponding to the path does not exist and one or more second paths corresponding to the path do not exist.

A second event corresponding to a path is defined as an event that the path exists but a first path corresponding to the path does not exist.

A first path corresponding to a path is another path that includes a quantity of edges that is less than a quantity of edges included in the path, and a second path corresponding to a path is another path that includes a quantity of edges that is equal to a quantity of edges included in the path.

A core idea of the present invention is that, as shown in FIG. 3, any two vertices in the nondeterministic graph are acquired; each path that uses the two vertices as a head and a tail is determined; a probability of a first event corresponding to each determined path is calculated, or a probability of a second event corresponding to each determined path is calculated; and a query result that satisfies a query condition is obtained by using the probability of the first event or the probability of the second event.

Figure 4:
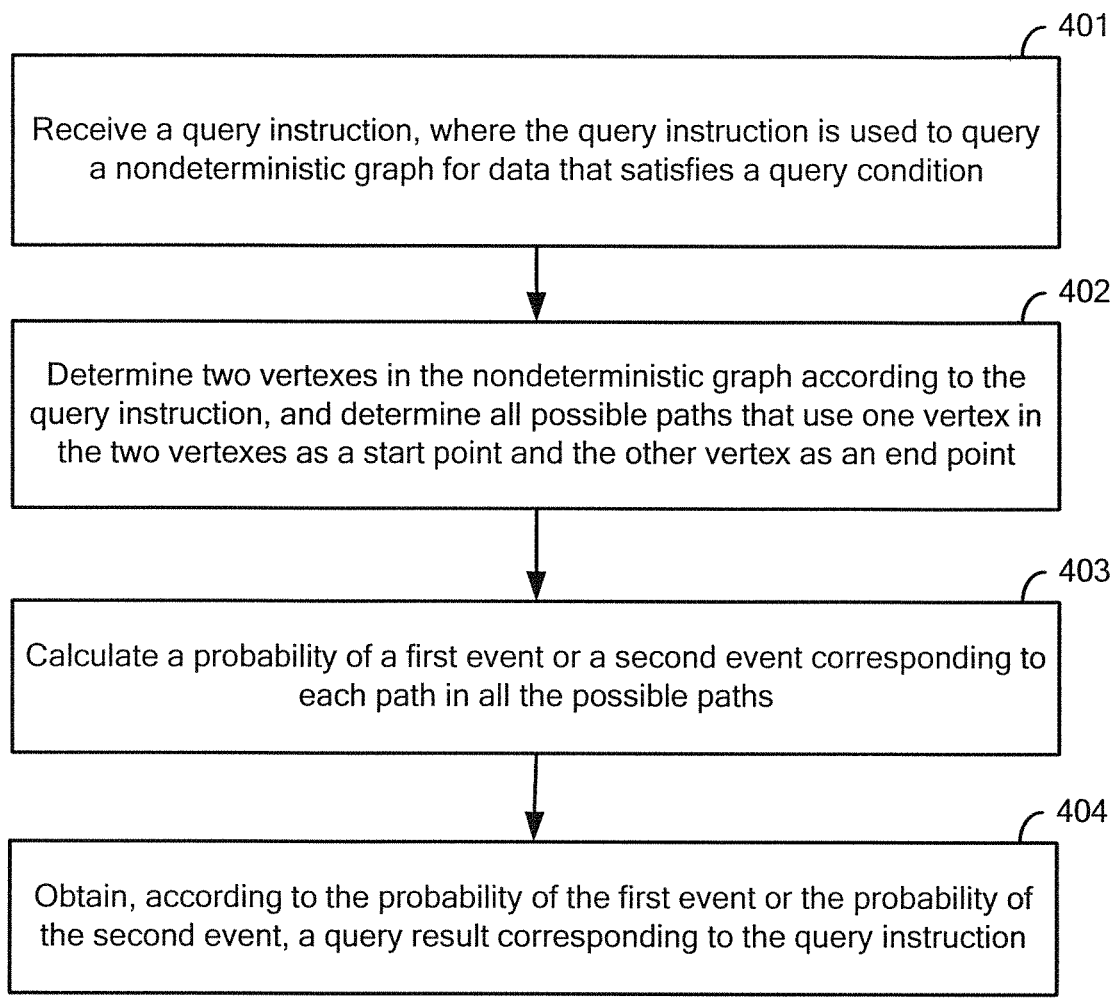
FIG. 4 is a flowchart of a method for querying a nondeterministic graph according to an embodiment of the present invention.

In an embodiment of the present invention, as shown in FIG. 4, a specific method for querying a nondeterministic graph is as follows:

Step 401: Receive a query instruction, where the query instruction is used to query the nondeterministic graph for data that satisfies a query condition.

In this embodiment of the present invention, the query instruction includes but is not limited to: a shortest distance query instruction, a reachability query instruction, and a shortest path query instruction. In a practical application, there may further be other query instructions, and other query instructions that can be applied to a nondeterministic graph are also included in the present invention.

Specifically, the shortest distance query instruction is used to query probability distribution of a path that is in the nondeterministic graph, uses one vertex in two vertices as a start point and the other vertex as an end point, and includes a set quantity of edges.

Specifically, the reachability query instruction is used to query a probability of existence of a path that is in the nondeterministic graph and uses one vertex in two vertices as a start point and the other vertex as an end point.

Specifically, the shortest path query instruction is used to query probability distribution of a path that is in the nondeterministic graph, uses one vertex in two vertices as a start point and the other vertex as an end point, and includes a least quantity of edges.

Step 402: Determine two vertices in the nondeterministic graph according to the query instruction, and determine all possible paths that use one vertex in the two vertices as a start point and the other vertex as an end point.

Step 403: Calculate a probability of a first event or a second event corresponding to each path in all the possible paths.

Preferably, all the determined possible paths are sorted in ascending order of a quantity of edges included in each of the determined possible paths, and the probability of the first event corresponding to each path in all the possible paths is calculated according to a sorting result, where the first event of each path is an event that the path exists but a third path corresponding to the path does not exist, and the third path corresponding to the path is another path that is sorted before the path in the sorting result; or all the determined possible paths are sorted in ascending order of a quantity of edges included in each of the determined possible paths, and the probability of the second event corresponding to each path in all the possible paths is calculated according to a sorting result, where the second event of each path is an event that the path exists but a first path corresponding to the path does not exist, and the first path corresponding to the path is another path that is sorted before the path in the sorting result and includes a quantity of edges that is less than a quantity of edges included in the path.

In the preferable embodiment, all the possible paths are sorted and the probability of the first event or the second event of each path is calculated according to the sorting result, which may further improve efficiency.

For example, it is assumed that any two vertices s and t in the nondeterministic graph are given, and there are l paths that use the two vertices as head and tail vertices, which are $P_1, P_2, \ldots P_l$ are sorted in ascending order of lengths of the paths, that is, if len($P_i$)<len($P_j$), i<j. A first event $Q_i$ is defined as an event that a path $P_i$ exists but a path that is sorted before $P_i$ in a list of all paths does not exist, which is expressed as $Q_i = \overline{P_1} \wedge \overline{P_2} \wedge \ldots \wedge \overline{P_{i-1}} \wedge P_i$, 2≤i≤l. A second event $Q'_i$ is defined as an event that the path $P_i$ exists but a path whose length is shorter than that of $P_i$ in the list of all paths does not exist, which is expressed as $Q'_i = \overline{P_1} \wedge P_2 \wedge \ldots \wedge \overline{P_g} \wedge P_i$, 2≤i≤l. $Q'_i$ has a same form as that of $Q_i$, but due to a length limitation, has fewer events that a path does not exist. In the expression of $Q'_i$, $P_1, P_2, \ldots, P_g$ are all paths that satisfy len($P_j$)<len($P_i$) in the list of paths, and herein 1≤j≤g.

Step 404: Obtain, according to the probability of the first event or the probability of the second event, a query result corresponding to the query instruction.

Preferably, according to different query instructions, obtaining, according to the probability of the first event or the probability of the second event, the query result corresponding to the query instruction has the following three specific implementation manners:

In a first manner, if the query instruction is a shortest distance query instruction, step 404 is specifically:

determining the path that includes the set quantity of edges from all the possible paths, calculating a sum of a probability of a first event corresponding to each path in the determined path, and using the sum of the probability as the query result.

In a specific embodiment, the query result may be a correspondence between a sum of probabilities and a corresponding set quantity.

In a second manner, if the query instruction is a reachability query instruction, step 404 is specifically:

for each path in all the possible paths, calculating a sum of probabilities of first events corresponding to the path and another path that is sorted before the path, and using the sum of the probabilities as the query result.

In specific implementation, the query result is a correspondence between each path in all the possible paths and a corresponding sum of probabilities.

In a third manner, if the query instruction is shortest path query, step 404 is specifically:

using each path in all the possible paths and a probability of a second event corresponding to the path as the query result.

For example, the first event $\mathcal{Q}_i$ is used to express query of a path that has a shortest distance. Specifically, for a given distance d, it is determined that $P_1, P_2, \ldots P_g$ are all paths that use s and t as head and tail vertices and whose lengths are less than d, and it is assumed that $P_{g+1}, P_{g+2}, \ldots P_{g+h}$ are all paths that use s and t as head and tail vertices and whose lengths are equal to d; then, a shortest distance event $\mathcal{D}_d$ that uses s and t as head and tail vertices may be described as that paths $P_1, P_2, \ldots P_g$ do not exist but at least one path in $P_{g+1}, P_{g+2}, \ldots P_{g+h}$ exists. $\mathcal{D}_d$ is expressed as $\mathcal{D}_d = \overline{P_1} \wedge \overline{P_2} \wedge \ldots \wedge \overline{P_g} \wedge (P_{g+1} \vee \ldots \vee P_{g+h})$, and a transformation of $P_{g+1} \vee \ldots \vee P_{g+h}$ may be $P_{g+1} \vee \ldots \vee P_{g+h} = P_{g+1} \vee (\overline{P_{g+1}} \wedge P_{g+2}) \vee \ldots \vee (\overline{P_{g+1}} \wedge \overline{P_{g+2}} \wedge \ldots \overline{P_{g+h-1}} \wedge P_{g+h})$. The transformation is substituted into the expression of $\mathcal{D}_d$, and the following expression of $\mathcal{D}_d$ indicated by the first event is obtained:

$$\mathcal{D}_d = (\overline{P_1} \wedge \overline{P_2} \wedge \ldots \wedge \overline{P_g} \wedge P_{g+1}) \vee (\overline{P_1} \wedge \overline{P_2} \wedge \ldots \wedge \overline{P_{g+1}} \wedge P_{g+2}) \vee$$
$$\ldots \vee (\overline{P_1} \wedge \overline{P_2} \wedge \ldots \wedge \overline{P_{g+h-1}} \wedge P_{g+h}) = \bigvee_{i=g+1}^{g+h} \mathcal{Q}_i$$

For another example, a reachability event $\mathcal{R}_d$ of two vertices s and t is defined as that at least one path in $P_1, P_2, \ldots P_l$ exists, and may be expressed as follows by using the first event:

$$\mathcal{R}_d = P_1 \vee P_2 \vee \ldots \vee P_l$$
$$= P_1 \vee (\overline{P_1} \wedge P_2) \vee \ldots \vee (\overline{P_1} \wedge \overline{P_2} \wedge \ldots \overline{P_{l-1}} \wedge P_l)$$
$$= \bigvee_{i=1}^{l} \mathcal{Q}_i$$

For another example, a shortest path event $\mathcal{Q}_{Pi}$ of two vertices s and t is defined as that a path P that uses s and t as head and tail vertices exists but a path that uses s and t as head and tail vertices and whose length is shorter does not exist. A length of the path $P_i$ is set to d, and it is assumed that $P_1, P_2, \ldots P_g$ are all paths that use s and t as head and tail vertices and whose length is less than d. Then, the shortest path event $\mathcal{Q}_{Pi}$ that uses s and t as head and tail vertices may be described as that paths $P_1, P_2, \ldots P_g$ do not exist but the path $P_i$ exists. The shortest path event $\mathcal{Q}_{Pi}$ may be expressed as follows by using the second event:

$$\mathcal{P}_{Pi} = \overline{P_1} \wedge \overline{P_2} \wedge \ldots \wedge \overline{P_g} \wedge P_i$$
$$= \mathcal{Q}'_i$$

Preferably, when the probability of the first event and the probability of the second event are calculated, an approximate value of the probability of the first event and an approximate value of the probability of the second event may be calculated by using a sampling algorithm. The approximate value of the probability of the first event is directly used as the probability of the first event and the approximate value of the probability of the second event is directly used as the probability of the second event, to obtain the query result. By using the sampling algorithm, the amount of calculation may be further reduced, and a calculation speed may be further improved.

In a practical application, all existing sampling algorithms may be used to calculate the approximate value of the probability of the first event and the approximate value of the probability of the second event, for example, an Approx-Path sampling algorithm. More sampling times indicate a more accurate approximate value obtained by means of calculation of the probability of the first event and a more accurate approximate value obtained by means of calculation of the probability of the second event.

Preferably, a specific process of calculating the approximate value of the probability of the first event and the approximate value of the probability of the second event is as follows:

selecting a set quantity of edges from the nondeterministic graph; determining a combination event corresponding to the selected edges, where the combination event indicates a combination of events that one or more edges in the selected edges exist or do not exist; and calculating a sum of probabilities of occurrence of all combination events corresponding to the selected edges and using the sum as a first cumulative sum;

when it is determined that the selected set quantity of edges constitute a path, and corresponding combination events satisfy a definition of the first event, calculating a sum of probabilities of occurrence of the combination events that satisfy the definition of the first event and using the sum as a second cumulative sum; or when it is determined that the selected set quantity of edges constitute a path, and corresponding combination events satisfy a definition of the second event, calculating a sum of probabilities of occurrence of the combination events that satisfy the definition of the second event and using the sum as a third cumulative sum; and calculating a sum of probabilities of existence of all paths in all the possible paths and using the sum as a fourth cumulative sum, and determining the probability of the first event according to the first cumulative sum, the second cumulative sum, and the fourth cumulative sum, or determining the probability of the second event according to the first cumulative sum, the third cumulative sum, and the fourth cumulative sum.

A set of the first event of each path in all the possible paths and a set of the second event of each path in all the possible paths are subsets of a combination event set.

The determining the probability of the first event according to the first cumulative sum, the second cumulative sum, and the fourth cumulative sum is specifically:

calculating a ratio of the second cumulative sum to the first cumulative sum, and using a value that is obtained by multiplying the ratio by the fourth cumulative sum as the probability of the first event.

The determining the probability of the second event according to the first cumulative sum, the third cumulative sum, and the fourth cumulative sum is specifically:

calculating a ratio of the third cumulative sum to the first cumulative sum, and using a value that is obtained by multiplying the ratio by the fourth cumulative sum as the probability of the second event.

For example, it is assumed that an ApproxPath algorithm is used to calculate the probability of the first event and the probability of the second event, and a specific process may be expressed by using pseudocode as follows:

Inputting paths $P_1, P_2, \ldots P_l$ that use s and t as head and tail vertices, and inputting total sampling times n;
begin
u=0;
for i=1:l
$w_i=0$, $w_i'=0$, the probability of the first event $Pr(Q_i)=0$, and the probability of the second event $Pr(Q_i')=0$;
for count=1:n
selecting a combination event $\pi$ from the combination event set, and calculating a probability $Pr(\pi)$ of the combination event $\pi$;
u=u+Pr($\pi$);
if $\pi$ satisfies an expression of the first event, then $w_i=w_i+Pr(\pi)$;
if $\pi$ satisfies an expression of the second event, then $w_i'=w_i'+Pr(\pi)$;
for i=1:l $$Pr(Q_i) = \frac{w_i}{u} \cdot \sum_{i=1}^{l} Pr(P_i);$$

$$Pr(Q_i') = \frac{w_i'}{u} \cdot \sum_{i=1}^{l} Pr(P_i);$$

outputting both $Pr(Q_i)$ and $Pr(Q_i')$.

For another example, the nondeterministic graph shown in FIG. 1 is used as an example. There are three paths that use a vertex 0 and a vertex 3 in the nondeterministic graph as head and tail vertices, which are $P_1=\{(0,3)\}$, $P_2=\{(0,1),(1,3)\}$, and $P_3=\{(0,1),(1,2),(2,3)\}$. The three paths have different lengths (that is, different quantities of edges). The following first event $Q$ and second event $Q'$ may be obtained: $Q_1=Q'_1=P_1$, $Q_2=Q'_2=\overline{P_1} \wedge P_2$, and $Q_3=Q'_3=P1 \wedge \overline{P_2} \wedge P_3$. $Pr(Q_1)=0.25$, $Pr(Q_3)=0.0636$, and $Pr(Q_3)=0.0636$ may be directly obtained by means of probability calculation based on an edge. Then, solutions for shortest distance query are $Pr(\mathcal{D}_1)=Pr(Q_1)=0.25$, $Pr(\mathcal{D}_2)=Pr(Q_2)=0.1071$, and $Pr(\mathcal{D}_3)=Pr(Q_3)=0.0636$; solutions for reachability query are $Pr(\mathcal{R}_1)=Pr(Q_1)=0.25$, $Pr(\mathcal{R}_2)=Pr(Q_1)+Pr(Q_2)=0.3571$, and $Pr(\mathcal{R}_2)=Pr(Q_1)+Pr(Q_2)+Pr(Q_2)=0.4171$; and solutions for shortest path query are $Pr(Q_{P1})=Pr(Q_1)=0.25$, $Pr(Q_{P2})=Pr(Q_2)=0.1071$, and $Pr(Q_3)=Pr(Q_3)=0.0636$.

Figure 5:
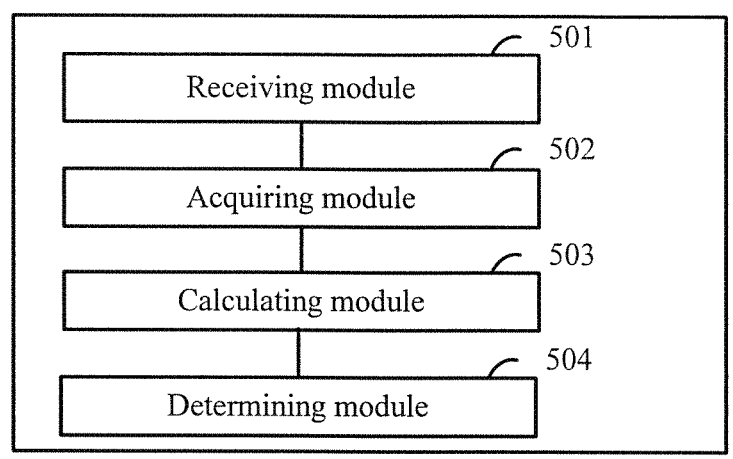
FIG. 5 is a schematic structural diagram of an apparatus for querying a nondeterministic graph according to an embodiment of the present invention.

Based on a same principle, as shown in FIG. 5, an embodiment of the present invention provides an apparatus for querying a nondeterministic graph. For specific implementation of the apparatus, reference may be made to the description of the foregoing method part, and repeated parts are not described. The apparatus mainly includes:

a receiving module 501, configured to receive a query instruction, where the query instruction is used to query the nondeterministic graph for data that satisfies a query condition;

an acquiring module 502, configured to determine two vertices in the nondeterministic graph according to the query instruction, and determine all possible paths that use one vertex in the two vertices as a start point and the other vertex as an end point;

a calculating module 503, configured to calculate a probability of a first event or a second event corresponding to each of the paths; and a determining module 504, configured to obtain, according to the probability of the first event or the probability of the second event, a query result corresponding to the query instruction.

Preferably, the calculating module is specifically configured to:

sort all the determined possible paths in ascending order of a quantity of edges included in each of the determined possible paths, and calculate, according to a sorting result, the probability of the first event corresponding to each of the paths, where the first event of each of the paths is an event that the path exists but a third path corresponding to the path does not exist, and the third path corresponding to the path is another path that is sorted before the path in the sorting result; or sort all the determined possible paths in ascending order of a quantity of edges included in each of the determined possible paths, and calculate, according to a sorting result, the probability of the second event corresponding to each of the paths, where the second event of each of the paths is an event that the path exists but a first path corresponding to the path does not exist, and the first path corresponding to the path is another path that is sorted before the path in the sorting result and includes a quantity of edges that is less than a quantity of edges included in the path.

Preferably, according to different query instructions, the determining module has the following three specific implementation manners:

In a first implementation manner, if the query instruction is a shortest distance query instruction, the determining module is specifically configured to:

determine a path that includes a set quantity of edges from all the possible paths, calculate a sum of a probability of a first event corresponding to each path in the determined path, and use the sum of the probability as the query result.

In a second implementation manner, if the query instruction is a reachability query instruction, the determining module is specifically configured to:

for each path in all the possible paths, calculate a sum of probabilities of first events corresponding to the path and another path that is sorted before the path, and use the sum of the probabilities as the query result.

In a third implementation manner, if the query instruction is shortest path query, the determining module is specifically configured to:

use each path in all the possible paths and a probability of a second event corresponding to the path as the query result.

Preferably, the calculating module is specifically configured to:

select a set quantity of edges from the nondeterministic graph; determine a combination event corresponding to the selected edges, where the combination event indicates a combination of events that one or more edges in the selected edges exist or do not exist; and calculate a sum of probabilities of occurrence of all combination events corresponding to the selected edges and use the sum as a first cumulative sum;

when it is determined that the selected set quantity of edges constitute a path, and corresponding combination events satisfy a definition of the first event, calculate a sum of probabilities of occurrence of the combination events that satisfy the definition of the first event and use the sum as a second cumulative sum; or when it is determined that the selected set quantity of edges constitute a path, and corresponding combination events satisfy a definition of the second event, calculate a sum of probabilities of occurrence of the combination events that satisfy the definition of the second event and use the sum as a third cumulative sum; and calculate a sum of probabilities of existence of all paths in all the possible paths and use the sum as a fourth cumulative sum, and determine the probability of the first event according to the first cumulative sum, the second cumulative sum, and the fourth cumulative sum, or determine the probability of the second event according to the first cumulative sum, the third cumulative sum, and the fourth cumulative sum.

Preferably, the calculating module is specifically configured to:

calculate a ratio of the second cumulative sum to the first cumulative sum, and use a value that is obtained by multiplying the ratio by the fourth cumulative sum as the probability of the first event; or calculate a ratio of the third cumulative sum to the first cumulative sum, and use a value that is obtained by multiplying the ratio by the fourth cumulative sum as the probability of the second event.

Figure 6:
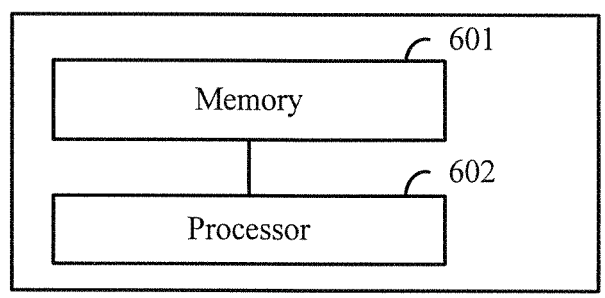
FIG. 6 is a schematic structural diagram of a device according to an embodiment of the present invention.

Based on a same invention concept, as shown in FIG. 6, an embodiment of the present invention further provides a device, where the device includes a memory 601 and a processor 602. The processor 602 executes a pre-configured computer program, so as to implement the method process in the foregoing method embodiment and implement a corresponding function; the memory 601 stores code of the computer program; and specifically:

the memory 601 is configured to store a nondeterministic graph; and the processor 602 is configured to execute the pre-configured computer program, so as to: receive a query instruction, where the query instruction is used to query the nondeterministic graph stored in the memory 601 for data that satisfies a query condition; determine two vertices in the nondeterministic graph according to the query instruction; determine all possible paths that use one vertex in the two vertices as a start point and the other vertex as an end point; calculate a probability of a first event or a second event corresponding to each of the paths; and obtain, according to the probability of the first event or the probability of the second event, a query result corresponding to the query instruction.

Preferably, the processor 602 is configured to:

sort all the determined possible paths in ascending order of a quantity of edges included in each of the determined possible paths, and calculate, according to a sorting result, the probability of the first event corresponding to each of the paths, where the first event of each of the paths is an event that the path exists but a third path corresponding to the path does not exist, and the third path corresponding to the path is another path that is sorted before the path in the sorting result; or sort all the determined possible paths in ascending order of a quantity of edges included in each of the determined possible paths, and calculate, according to a sorting result, the probability of the second event corresponding to each of the paths, where the second event of each of the paths is an event that the path exists but a first path corresponding to the path does not exist, and the first path corresponding to the path is another path that is sorted before the path in the sorting result and includes a quantity of edges that is less than a quantity of edges included in the path.

Preferably, according to different query instructions, the processor 602 has the following three specific implementation manners:

In a first implementation manner, if the query instruction is a shortest distance query instruction, the processor 602 is specifically configured to:

determine the path that includes a set quantity of edges from all the possible paths, calculate a sum of a probability of a first event corresponding to each path in the determined path, and use the sum of the probability as the query result.

In a second implementation manner, if the query instruction is a reachability query instruction, the processor 602 is specifically configured to:

for each path in all the possible paths, calculate a sum of probabilities of first events corresponding to the path and another path that is sorted before the path, and use the sum of the probabilities as the query result.

In a third implementation manner, if the query instruction is shortest path query, the processor 602 is specifically configured to:

use each path in all the possible paths and a probability of a second event corresponding to the path as the query result.

Preferably, the processor 602 is specifically configured to:

select a set quantity of edges from the nondeterministic graph; determine a combination event corresponding to the selected edges, where the combination event indicates a combination of events that one or more edges in the selected edges exist or do not exist; and calculate a sum of probabilities of occurrence of all combination events corresponding to the selected edges and use the sum as a first cumulative sum;

when it is determined that the selected set quantity of edges constitute a path, and corresponding combination events satisfy a definition of the first event, calculate a sum of probabilities of occurrence of the combination events that satisfy the definition of the first event and use the sum as a second cumulative sum; or when it is determined that the selected set quantity of edges constitute a path, and corresponding combination events satisfy a definition of the second event, calculate a sum of probabilities of occurrence of the combination events that satisfy the definition of the second event and use the sum as a third cumulative sum; and calculate a sum of probabilities of existence of all paths in all the possible paths and use the sum as a fourth cumulative sum, and determine the probability of the first event according to the first cumulative sum, the second cumulative sum, and the fourth cumulative sum, or determine the probability of the second event according to the first cumulative sum, the third cumulative sum, and the fourth cumulative sum.

Preferably, the processor 602 is specifically configured to:

calculate a ratio of the second cumulative sum to the first cumulative sum, and use a value that is obtained by multiplying the ratio by the fourth cumulative sum as the probability of the first event; or calculate a ratio of the third cumulative sum to the first cumulative sum, and use a value that is obtained by multiplying the ratio by the fourth cumulative sum as the probability of the second event.

Based on the foregoing technical solutions, in the embodiments of the present invention, a query result that satisfies a query condition is obtained by calculating a probability of a first event or a second event corresponding to each possible path, which can simplify different query conditions to an expression of the first event or the second event, thereby avoiding graph searching performed on exponential graph instances derived from a nondeterministic graph, implementing quick query of the nondeterministic graph, reducing query complexity, and improving query efficiency.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device, so that a series of operations and steps are performed on the computer or any other programmable device, so as to generate computer-implemented processing. Therefore, the instructions executed on the computer or any other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the protection scope defined by the following claims and their equivalent technologies.

What is claimed is:

1. A method for querying a nondeterministic graph, the method comprising:

receiving a query instruction, wherein the query instruction is used to query a nondeterministic graph for data that satisfies a query condition;

determining two vertices in the nondeterministic graph according to the query instruction, and determining all possible paths that use one vertex in the two vertices as a start point and the other vertex as an end point;

calculating a probability of a first event or a second event corresponding to each of the paths based on a sorting result of the determined possible paths, wherein:

the first event corresponding to a path is defined as an event that the path exists, but a first path corresponding to the path does not exist and one or more second paths corresponding to the path do not exist;

the second event corresponding to the path is defined as an event that the path exists but the first path corresponding to the path does not exist;

the first path corresponding to a path is another path that comprises a quantity of edges that is less than a quantity of edges comprised in the path; and a second path corresponding to a path is another path that comprises a quantity of edges that is equal to a quantity of edges comprised in the path; and obtaining, according to the probability of the first event or the probability of the second event, a query result corresponding to the query instruction;

wherein calculating the probability of a first event or a second event corresponding to each of the paths comprises:

selecting a set quantity of edges from the nondeterministic graph; determining a combination event corresponding to the selected edges, wherein the combination event indicates a combination of events that one or more edges in the selected edges exist or do not exist; and calculating a sum of probabilities of occurrence of all combination events corresponding to the selected edges and using the sum as a first cumulative sum;

when it is determined that the selected set quantity of edges constitute a path, and corresponding combination events satisfy a definition of the first event, calculating a sum of probabilities of occurrence of the combination events that satisfy the definition of the first event and using the sum as a second cumulative sum; or when it is determined that the selected set quantity of edges constitute a path, and corresponding combination events satisfy a definition of the second event, calculating a sum of probabilities of occurrence of the combination events that satisfy the definition of the second event and using the sum as a third cumulative sum; and calculating a sum of probabilities of existence of all paths in all the possible paths and using the sum as a fourth cumulative sum, and determining the probability of the first event according to the first cumulative sum, the second cumulative sum, and the fourth cumulative sum, or determining the probability of the second event according to the first cumulative sum, the third cumulative sum, and the fourth cumulative sum.

2. The method according to claim 1, wherein
calculating the probability of a first event corresponding to each of the paths comprises:
sorting all the determined possible paths in ascending order of a quantity of edges comprised in each of the determined possible paths, and
calculating, according to a sorting result, the probability of the first event corresponding to each of the paths, wherein the first event of each of the paths is an event that the path exists but a third path corresponding to the path does not exist, and the third path corresponding to the path is another path that is sorted before the path in the sorting result; or
calculating the probability of a second event corresponding to each of the paths comprises:
sorting all the determined possible paths in ascending order of a quantity of edges comprised in each of the determined possible paths, and
calculating, according to a sorting result, the probability of the second event corresponding to each of the paths, wherein the second event of each of the paths is an event that the path exists but a first path corresponding to the path does not exist, and the first path corresponding to the path is another path that is sorted before the path in the sorting result and comprises a quantity of edges that is less than a quantity of edges comprised in the path.

3. The method according to claim 2, wherein the query instruction is a shortest distance query instruction, which is used to query probability distribution of a path that is in the nondeterministic graph, uses one vertex in the two vertices as a start point and the other vertex as an end point, and comprises a set quantity of edges; and
obtaining, according to the probability of the first event or the probability of the second event, the query result corresponding to the query instruction comprises:
determining the path that comprises the set quantity of edges from all the possible paths, calculating a sum of a probability of a first event corresponding to each path in the determined path, and using the sum of the probability as the query result.

4. The method according to claim 2, wherein the query instruction is a reachability query instruction, which is used to query a probability of existence of a path that is in the nondeterministic graph and uses one vertex in the two vertices as a start point and the other vertex as an end point; and
obtaining, according to the probability of the first event or the probability of the second event, the query result corresponding to the query instruction comprises:
for each path in all the possible paths, calculating a sum of probabilities of first events corresponding to the path and another path that is sorted before the path, and using the sum of the probabilities as the query result.

5. The method according to claim 2, wherein the query instruction is a shortest path query, which is used to query probability distribution of a path that is in the nondeterministic graph, uses one vertex in the two vertices as a start point and the other vertex as an end point, and comprises a least quantity of edges; and
obtaining, according to the probability of the first event or the probability of the second event, the query result corresponding to the query instruction comprises:
using each path in all the possible paths and a probability of a second event corresponding to the path as the query result.

6. The method according to claim 1, wherein determining the probability of the first event according to the first cumulative sum, the second cumulative sum, and the fourth cumulative sum, or determining the probability of the second event according to the first cumulative sum, the third cumulative sum, and the fourth cumulative sum comprises:
calculating a ratio of the second cumulative sum to the first cumulative sum, and using a value that is obtained by multiplying the ratio by the fourth cumulative sum as the probability of the first event; or
calculating a ratio of the third cumulative sum to the first cumulative sum, and using a value that is obtained by multiplying the ratio by the fourth cumulative sum as the probability of the second event.

7. An apparatus for querying a nondeterministic graph, comprising:
at least one processor; and
a memory storing instructions executable by the at least one processor, wherein the instructions, when executed by the at least one processor, instruct the at least one processor to:
receive a query instruction, wherein the query instruction is used to query a nondeterministic graph for data that satisfies a query condition;
determine two vertices in the nondeterministic graph according to the query instruction;
determine all possible paths that use one vertex in the two vertices as a start point and the other vertex as an end point;
calculate a probability of a first event or a second event corresponding to each of the paths based on a sorting result of the determined possible paths, wherein:
the first event corresponding to a path is defined as an event that the path exists, but a first path corresponding to the path does not exist and one or more second paths corresponding to the path do not exist;
the second event corresponding to the path is defined as an event that the path exists but the first path corresponding to the path does not exist;
the first path corresponding to a path is another path that comprises a quantity of edges that is less than a quantity of edges comprised in the path; and
a second path corresponding to a path is another path that comprises a quantity of edges that is equal to a quantity of edges comprised in the path; and
obtain, according to the probability of the first event or the probability of the second event, a query result corresponding to the query instruction,
wherein the instructions further instruct the at least one processor to:
select a set quantity of edges from the nondeterministic graph;
determine a combination event corresponding to the selected edges, wherein the combination event indicates a combination of events that one or more edges in the selected edges exist or do not exist; and
calculate a sum of probabilities of occurrence of all combination events corresponding to the selected edges and use the sum as a first cumulative sum;
when it is determined that the selected set quantity of edges constitute a path, and corresponding combination events satisfy a definition of the first event, calculate a sum of probabilities of occurrence of the combination events that satisfy the definition of the first event and use the sum as a second cumulative sum; or when it is determined that the selected set quantity of edges constitute a path, and corresponding combination events satisfy a definition of the second event, calculate a sum of probabilities of occurrence of the combination events that satisfy the definition of the second event and use the sum as a third cumulative sum; and calculate a sum of probabilities of existence of all paths in all the possible paths and use the sum as a fourth cumulative sum, and determine the probability of the first event according to the first cumulative sum, the second cumulative sum, and the fourth cumulative sum, or determine the probability of the second event according to the first cumulative sum, the third cumulative sum, and the fourth cumulative sum.

8. The apparatus according to claim 7, wherein the instructions further instruct the at least one processor to:

sort all the determined possible paths in ascending order of a quantity of edges comprised in each of the determined possible paths, and calculate, according to a sorting result, the probability of the first event corresponding to each of the paths, wherein the first event of each of paths is an event that the path exists but a third path corresponding to the path does not exist, and the third path corresponding to the path is another path that is sorted before the path in the sorting result; or sort all the determined possible paths in ascending order of a quantity of edges comprised in each of the determined possible paths, and calculate, according to a sorting result, the probability of the second event corresponding to each of the paths, wherein the second event of each of paths is an event that the path exists but a first path corresponding to the path does not exist, and the first path corresponding to the path is another path that is sorted before the path in the sorting result and comprises a quantity of edges that is less than a quantity of edges comprised in the path.

9. The apparatus according to claim 8, wherein the query instruction is a shortest distance query instruction, which is used to query probability distribution of a path that is in the nondeterministic graph, uses one vertex in the two vertices as a start point and the other vertex as an end point, and comprises a set quantity of edges; and the instructions further instruct the at least one processor to:

determine the path that comprises the set quantity of edges from all the possible paths, calculate a sum of a probability of a first event corresponding to each path in the determined path, and use the sum of the probability as the query result.

10. The apparatus according to claim 8, wherein the query instruction is a reachability query instruction, which is used to query a probability of existence of a path that is in the nondeterministic graph and uses one vertex in the two vertices as a start point and the other vertex as an end point; and the instructions further instruct the at least one processor to:

for each path in all the possible paths, calculate a sum of probabilities of first events corresponding to the path and another path that is sorted before the path, and use the sum of the probabilities as the query result.

11. The apparatus according to claim 8, wherein the query instruction is a shortest path query, which is used to query probability distribution of a path that is in the nondeterministic graph, uses one vertex in the two vertices as a start point and the other vertex as an end point, and comprises a least quantity of edges; and the instructions further instruct the at least one processor to:

use each path in all the possible paths and a probability of a second event corresponding to the path as the query result.

12. The apparatus according to claim 7, wherein the instructions further instruct the at least one processor to:

calculate a ratio of the second cumulative sum to the first cumulative sum, and use a value that is obtained by multiplying the ratio by the fourth cumulative sum as the probability of the first event; or calculate a ratio of the third cumulative sum to the first cumulative sum, and use a value that is obtained by multiplying the ratio by the fourth cumulative sum as the probability of the second event.

* * * * *